United States Patent
Ota

[15] 3,659,200
[45] Apr. 25, 1972

[54] METHOD AND APPARATUS FOR AUTOMATICALLY DETERMINING CHARACTERISTIC PARAMETERS

[72] Inventor: Tadashi Ota, Montebello, Calif.
[73] Assignee: Globe-Union Inc., Milwaukee, Wis.
[22] Filed: May 26, 1969
[21] Appl. No.: 827,723

[52] U.S. Cl. ................................324/158 D, 324/103 P
[51] Int. Cl. ...............................G01r 31/22, G01r 19/16
[58] Field of Search.................324/158, 158 D, 158 T, 103, 324/103 P

[56] References Cited

UNITED STATES PATENTS 2,802,177   8/1957   Roach.................................324/158
3,466,546   9/1969   Shinohara...........................324/158

OTHER PUBLICATIONS

Bannon, D. W.; " Measurement of..."; IBM Technical Disclosure Bulletin; Vol. 10, No. 8, Jan. 1968, pgs. 1083–1084.
Dance, J. B.; " Tunnel Diode Measurements" ; Wireless World; Vol. 71; No. 3; March 1965; pages 108– 112

Primary Examiner—Rudolph V. Rolinec
Assistant Examiner—Ernest F. Karlsen
Attorney—Pendleton, Neuman, Williams & Anderson

[57] ABSTRACT

A method and apparatus for automatically determining the characteristic parameters of a tunnel diode or other device having nonlinear and preferably not monotonic characteristics, that is having a peak or valley in its characteristic curve, is disclosed. A bias voltage is applied to the diode at a level determined by the output of a dependent ramp source, the source being such that on application of an input pulse the applied bias level increases. A 100 Hertz small signal square wave voltage is also applied to the diode and an AND gate determines the phase relationship of that voltage and the resultant square wave current through the diode. The AND gate output triggers the dependent ramp source increasing the applied bias voltage until such a peak or valley point is reached or passed.

14 Claims, 3 Drawing Figures

INVENTOR
TADASHI OTA

BY: Pendleton, Neuman
Seibold & Williams
ATTY'S

3,659,200

METHOD AND APPARATUS FOR AUTOMATICALLY DETERMINING CHARACTERISTIC PARAMETERS

BACKGROUND OF THE INVENTION

This invention relates to electrical measuring apparatus and more particularly to apparatus for measuring the characteristic parameters of electrical devices having voltage-current characteristic curves which are other than monotonic.

There exist various types of electrical devices having voltage-current characteristic curves which are other than monotonic, i.e. which exhibit critical points where their slopes change from positive to negative or from negative to positive. Two particular examples are the tunnel diode and the unijunction transistor. The areas surrounding those critical points are often referred to as peaks or valleys, respectively. For engineering application of such devices it is often sufficient to describe them by stating the voltages and currents at which those critical points occur. Those voltages and currents are known as the characteristic parameters of the device.

In order that the characteristic parameters be useful, it is necessary that they be stated accurately. Further, since the parameters may vary from device to device, it is desirable to have some means for accurately measuring the parameters of any individual device. If the measurements are to be made on a systematic or a production line basis, they should be made quickly.

Apparatus and methods for measuring the characteristic parameters of devices having nonmonotonic characteristic curves have heretofore been proposed. They have, however, had many disadvantages associated therewith. Often they merely displayed the characteristic curve on the face of an oscilloscope. Reading the characteristic parameters from such a display was difficult and created a significant probability of operator error. In other prior apparatus a d.c. bias source was required and it was manually adjusted until some visual readout device indicated that a critical point had been reached. Such methods also involved high probabilities of operator error because of the precision with which the manual adjustment had to be made. Further, prior characteristic parameter-determining circuits have not automatically followed the characteristic parameters as they shifted, say with temperature.

SUMMARY

This invention provides an apparatus which automatically seeks and holds a peak or valley level on the voltage-current curve of a device under test and thus provides a method for automatically ascertaining the characteristic parameters. A dependent ramp source generates a controllably variable bias level for the device and is controlled by the output of a gate. A small pulse signal is superimposed on the bias. Two signals are applied to the gate, one related to the polarity of the pulse voltage applied to the device and one related to the polarity of the pulse current through the device.

When the pulses are in a first polarity relationship, the gate produces an output effective to progressively change the output of the dependent ramp source; when the pulses are in a second polarity relationship, no such output is produced. Thus when the device under test is connected to the apparatus, the level of the applied bias will vary until the polarity relationship between the two pulses changes, indicating a critical point has been passed, and then hold that bias level until it may be conveniently read out. Additionally, the apparatus may be adapted to follow the critical point if it should subsequently shift, as, for example, with temperature.

It is thus an object of this invention to provide a method and apparatus for automatically determining the characteristic parameters of a device having a voltage-current characteristic curve which is other than monotonic.

It is an object of this invention to provide a method and apparatus for determining the characteristic parameters of a nonmonotonic device with greater accuracy than has heretofore been practical.

It is an object of this invention to provide a method and apparatus for determining the characteristic parameters of such a device wherein the probability of operator error is minimized.

It is an additional object of this invention to provide a method and apparatus for determining the characteristic parameters of devices having characteristic voltage-current curves which are other than monotonic and which will automatically follow the critical points as they shift, as with temperature.

It is a further object of this invention to provide a method and apparatus for determining the characteristic parameters of a device with an other-than-monotonic voltage-current characteristic curve, the apparatus using a small number of components and an inexpensive design.

It is a still further object of this invention to provide a method and apparatus for determining the characteristic parameters of a tunnel diode fulfilling all the aforementioned objects.

Further and additional objects of this invention will appear from the following specification, the drawing, and the appended claims.

DESCRIPTION OF THE PREFERRED EMBODIMENT

In the subsequent description the present invention will be described with reference to a method and apparatus for automatically determining the characteristic parameters of a tunnel diode. It will be obvious to those skilled in the art that the invention could be used to determine the characteristic parameters of any device having a characteristic voltage-current curve which is other than monotonic.

Figure 1:
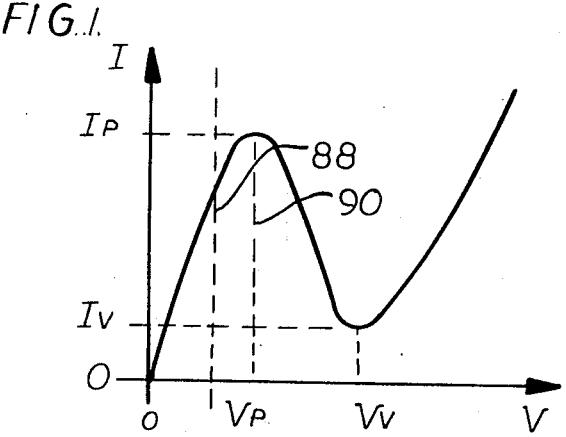
FIG. 1 is a graphical representation of the voltage-current characteristic of a typical tunnel diode.

In FIG. 1 is shown a graph having the shape of the characteristic voltage-current curve of a typical tunnel diode. A monotonic curve is one in which the dependent variable, indicated as I or current in FIG. 1, either never decreases or never increases as the independent variable, V or voltage, increases. The curve in FIG. 1 is thus other than monotonic. It has two critical points. At the first point, the peak, the slope of the voltage-current curve, and thus the rate of change of resistance, dynamic resistance or incremental resistance, $\Delta R$, of the diode, changes from positive to negative; at the second point, the valley, the slope, and thus the incremental resistance, $\Delta R$, changes from negative to positive. The voltages and currents at the two critical points, $V_p$, $V_v$, $I_p$, $I_v$, are the characteristic parameters of a device of this character. When the diode is biased to operate in an area of positive dynamic resistance, a small change in the voltage applied across the diode will create a small change in the current through the diode of the same polarity. When the diode operates in the area of negative dynamic resistance, a small change in the voltage will create a current change of the opposite polarity. This invention utilizes the polarity inversion of the current change as the diode under test passes through a critical voltage point to determine its characteristic parameters.

Figure 2:
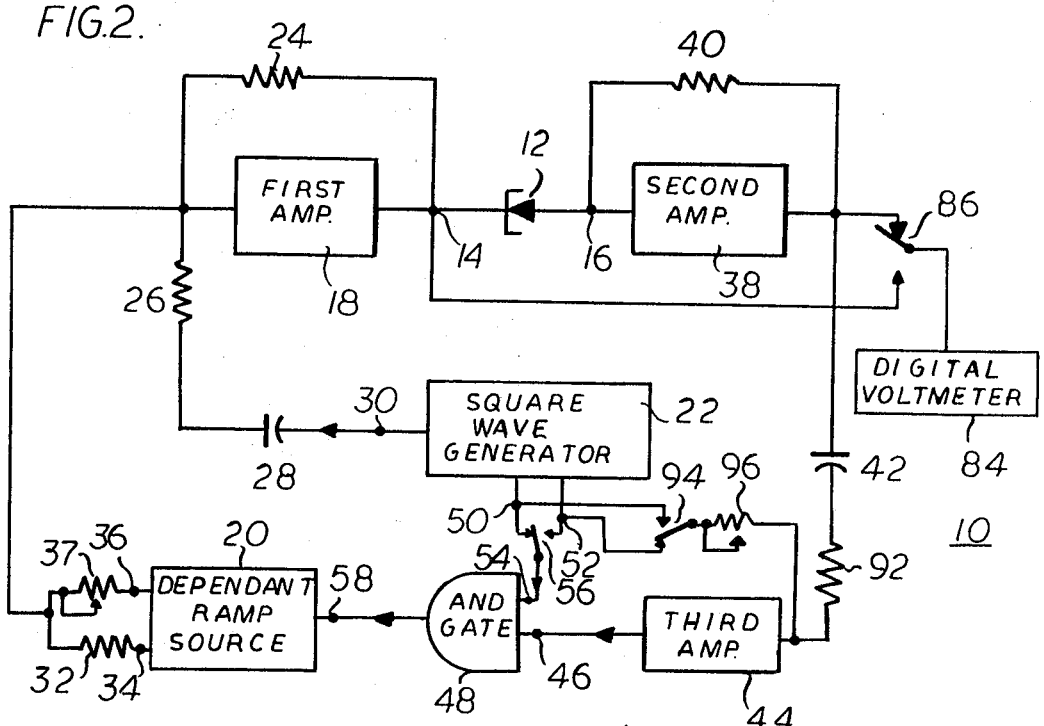
FIG. 2 is a block diagram of an apparatus incorporating a preferred embodiment of the present invention.

An apparatus 10 incorporating the present invention is disclosed in FIG. 2. The diode to be tested 12 is connected to the apparatus 10 with its cathode at a terminal point 14 and its anode at a terminal point 16. Two signals are applied from a first amplifier 18 to terminal point 14, a variable level bias signal the voltage of which is controlled by a dependent ramp source 20, and a small signal square wave originating from a 100 Hertz square wave generator 22. First amplifier 18 is direct coupled and has a high negative gain, a high input impedance and an input at virtual ground. It may thus conveniently include a conventional operational amplifier.

A feedback resistor 24 is coupled between the input and the output of first amplifier 18, an input resistor 26 and coupling capacitor 28 between an output 30 of square wave generator 22 and the input of first amplifier 18, and an input resistor 32 between an output 34 of dependent ramp source 20 and the input of first amplifier 18. Resistors 24, 26 and 32 may thus be used to scale the output of dependent ramp source 20 and square wave generator 22 in accord with conventional principles. An output 36 of dependent ramp source 20 is coupled to the input of first amplifier 18 through a variable resistor 37.

Terminal point 16 is coupled to the input of a second amplifier 38. Like first amplifier 18, second amplifier 38 is direct coupled and has a high negative gain, a high input impedance and an input at virtual ground. It may also conveniently include a conventional operational amplifier. A feedback resistor 40 is connected between the input and output of second amplifier 38. Second amplifier 38 has as its output a voltage proportional to the current through diode 12. Resistor 40 is a scaling resistor.

The output of second amplifier 38 is a.c. coupled through a capacitor 42 to the input of a third amplifier 44. Third amplifier 44 merely amplifies the square wave output from second amplifier 38 and applies it to a first input of a gate means, in this exemplary embodiment an input 46 of an AND gate 48. Two outputs 50 and 52 from square wave generator 22 are switchably applied to a second input 54 of AND gate 48 through a single pole double throw switch 56, as shown. Outputs 30 and 50 of square wave generator 22 are in phase while output 52 is 180° out of phase with them. A signal is thus applied to first input 46 which is related to the phase of the square wave current through diode 12; a signal is applied to second input 54 which is related to the phase of the square wave voltage across diode 12. The output of AND gate 48 is applied to an input 58 of dependent ramp source 20 and is such that every time two pulses of a given polarity are simultaneously applied to both first and second inputs 46 and 54, an output pulse is applied to dependent ramp source 20.

In this exemplary embodiment, AND gate 48 may be considered a phase detector; it will generate a pulse train at the square wave frequency, 100 Hertz, when the signals applied to inputs 46 and 54 are in phase but will have a constant output when those signals are 180° out of phase. However, many types of pulse generators may be substituted for square wave generator 22. For the sake of generality then, it is advantageous to visualize square wave generator 22 as a rectangular pulse generator simultaneously emitting pulses of one polarity from outputs 30 and 50 and pulses of opposite polarity from output 52. AND gate 48 may then be viewed as a detector for determining the polarity relationship of the small signal current and voltage pulses through and across diode 12. Then, in the described embodiment, pulses having a fixed relationship to the polarity of the applied voltage pulses are supplied to input 54 of AND gate 48 and pulses having a fixed relationship to the polarity of the resultant current pulses are supplied to input 46. The AND gate will issue pulses from its output only when the relationship of the current and voltage pulses is in one predetermined condition; otherwise its output will be constant. The remainder of this disclosure will use the pulse conceptualization.

Figure 3:
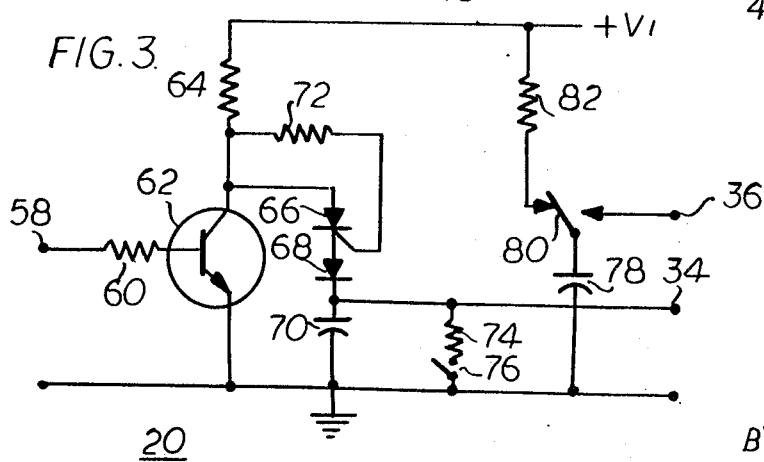
FIG. 3 is a schematic diagram of the dependent ramp source included in the embodiment of FIG. 2.

A detailed schematic representation of dependent ramp source 20 is given in FIG. 3. Input 58 is coupled through a resistor 60 to the base of an NPN transistor 62. The emitter of transistor 60 is connected to ground and the collector is coupled through a resistor 64 to a source of positive voltage V1. (Neither voltage sources or ground connections are shown in FIG. 2.) The collector of transistor 62 is also connected to the anode of a silicon controlled rectifier 66, the cathode of which is connected to the anode of a diode 68. The cathode of diode 68 is connected to output 34. A capacitor 70 is connected between output 34 and ground. The collector of transistor 62 is additionally coupled through a resistor 72 to the gate of silicon controlled rectifier 66.

AND gate 48 is such that it normally maintains input 58 at a positive voltage but when properly triggered supplies negative going pulses to ground level. Transistor 62 is, thus, normally conducting but is cut off by the negative pulses, thus raising the voltage at the collector of transistor 62 and triggering silicon controlled rectifier 66. While the silicon controlled rectifier is conducting, a small amount of current flows to capacitor 70 and places a small positive charge on it, thus placing output 34 at a small positive voltage. As subsequent negative going pulses are applied to input 58, the voltage at output 34 thus increases in essentially a stepped manner. The slope of the stepped ramps formed by these pulses is determined by the time constant of the network comprising the basic elements of capacitor 70 and resistor 64.

A series combination of a resistor 74 and a switch 76 is placed across capacitor 70. When the switch is closed, capacitor 70 will discharge through it reducing the output voltage to zero. It should be noted that since the resistance across capacitor 70 is not infinite, due to its own leakage, the reverse leakages of the silicon controlled rectifier 66 and diode 68, and the less than infinite input impedance of first amplifier 18, it will slowly discharge between application of pulses to input 58.

Dependent ramp source 20 additionally comprises a capacitor 78 connected between ground and the movable contact of a single pole double throw switch 80. One contact of switch 80 is connected to output 36 and the other is coupled to a source of positive voltage through a current limiting resistor 82. Switch 80 is normally thrown so that capacitor 78 charges to a positive voltage. When the valley parameters of a diode are to be measured, however, switch 80 is temporarily thrown to the other position so that the output of first amplifier 18 is abruptly increased and the diode is forced to operate past the peak point. Variable resistor 37 may be adjusted so that the diode is forced to operate near its valley point when switch 80 is thrown.

In one exemplary embodiment of this invention, the components used in dependent ramp source 20 had the following values:

| Resistor 60 | 100 kilohms |
| Resistor 64 | 2.2 kilohms |
| Capacitor 70 | 6000 microfarads |
| Resistor 72 | 2.2 kilohms |
| Resistor 74 | 1 ohm |
| Capacitor 78 | 500 microfarads |

A digital voltmeter 84 is connected to the movable contact of a single pole double throw switch 86. One contact of that switch is connected to the output of first amplifier 18 and the other to the output of second amplifier 38. Digital voltmeter 84 is also connected to a common ground between first amplifier 18, dependent ramp source 20, square wave generator 22, second amplifier 38, third amplifier 44, and AND gate 48. When digital voltmeter 84 is connected to the output of first amplifier 18 it will measure the voltage applied to diode 12 at terminal 14 since the input of second amplifier 38 is at virtual ground. When it is connected to the output of second amplifier 38 it will measure a small voltage proportional to the current through diode 14. Digital voltmeter 84 must include appropriate filtering to remove the pulse components from the measured voltages.

The circuit described will thus automatically seek and hold the diode at its peak or valley critical points so that the characteristic parameters may easily be measured. To determine the peak parameters, the diode under test is inserted between points 14 and 16 and switch 76 is closed for a short time and then opened, reducing the bias level to zero. A small signal voltage pulse with no bias is applied to the diode producing a small signal current pulse through the diode of the same polarity as the applied voltage pulse. The current pulse is read as a small voltage pulse at terminal 16 and amplified to a usable level by second and third amplifiers 38 and 40 and applied to first input 46 of AND gate 48. With the second input 54 of the AND gate connected to the output 50 of square wave generator 22 that is in phase with output 30, the AND gate will apply a pulse to the input 58 of the dependent ramp source 20, thus increasing the output level of the dependent ramp source, as long as the current pulse through diode 12 is of the same polarity as the voltage pulse applied to it, i.e. as long as the diode is operated in an area of positive dynamic resistance. When, however, sufficient bias is applied to cause the diode to operate at or past the peak point into the area of negative dynamic resistance, the current pulse will have an opposite polarity from the voltage pulse or will disappear and the AND gate 48 will no longer apply input pulses to dependent ramp source 20. The circuit, thus, automatically seeks and holds the peak point. Moreover, after reaching the peak the square wave generator 22 continues to apply voltage pulses to the device, thus checking to see whether the peak point has shifted, perhaps because of changes in the temperature of the diode. If it shifts to a higher voltage or current, the current and voltage pulses will again be of the same polarity and the output of the dependent ramp source will be increased until the new peak is reached. If it shifts to a lower voltage or current, capacitor 70 in the dependent ramp source 20 will discharge thus reducing the bias applied to the diode until the voltage and current pulses are again of the same polarity and the output of dependent ramp source 20 will again begin to increase.

To determine the valley parameters a similar operation is followed except that switch 56 is thrown so that the second input 54 of AND gate 48 is coupled to output 52 of square wave generator 22 and switch 80 is temporarily thrown to connect capacitor 78 to output 36, thus forcing the diode into its valley region. If the diode is then operated at a bias higher than its valley point, capacitor 70 will discharge and the operation will be similar to that described in the preceding paragraph when the diode was operated beyond the peak point. If the diode is initially operated at a voltage less than that at its valley point, the circuit will seek and hold the valley point as discussed above.

It is, of course, desirable to operate diode 12 so that it is stable. This is easy to do the described embodiment as the output impedance of first amplifier 18 may be made very low. Further, if the diode should start oscillating while being operated in its area of negative resistance, appropriate phase correction capacitors may be inserted in parallel with feedback resistors 24 and 40 to prevent it. In the exemplary embodiment, a 0.001 microfarad capacitor (not shown) was placed in parallel with resistor 24 and a 0.03 microfarad capacitor (not shown) was placed in parallel with resistor 40 both resistors 24 and 40 being 1 kilohm.

It is also possible to operate the described equipment in such a manner that a particular slope on the characteristic curve is detected. For example, for some particular purpose the user might desire detection of a point 88 on the characteristic curve. If a resistor 92 is inserted between capacitor 42 and the input to third amplifier 44 and a single pole double throw switch 94 added to selectably apply outputs 50 and 52 of square wave generator 22 through a variable resistor 96 to the input of third amplifier 44, the resulting injection of a small 100 Hertz bias signal will cause the phase reversal as detected at AND gate 48 to occur at a point offset from the zero slope line 90. The magnitude of the offset is determined by the values of resistors 92 and 96, while its position to the right or left of line 90 in FIG. 1 is determined by the position of switch 94.

The characteristic parameter determining circuit just described is capable of very high accuracy. The total error depends primarily on the accuracy of feedback resistor 40 and digital voltmeter 84, the input offset of second amplifier 38, and the minimum pulse level which can be detected at the output of second amplifier 38, and thus the gain of third amplifier 44 and the input level required to trigger AND gate 48. In one embodiment of the present invention designed to determine the characteristic parameters of tunnel diodes having a peak current on the order of 1 milliampere, a feedback resistor 40 of 1,000 ohms, ± 0.01 percent, a digital voltmeter with an accuracy of ± 0.005 percent, a second amplifier 38 with an input offset of approximately 50 microvolts, a third amplifier 44 with an amplification of 10,000, and an AND gate 46 which required a 10 volt pulse to trigger it were used. The total accumulated error of that embodiment was approximately 0.120 percent.

It will be obvious that certain modifications may be made in the above-described embodiment without exceeding the spirit and scope of this invention. For example, a pulse generator supplying a chain of pulses of almost arbitrary shape might be substituted for the 100 Hertz square wave generator 22. A different form of gate means other than AND gate 48 might be used to determine the polarity relationship of the small signal voltage and current pulses, across and through the diode. Read-out devices other than digital voltmeter 84 might be used.

It will thus be seen that a method and apparatus fulfilling all of the above-mentioned objects has been provided. While a particular embodiment of this invention is shown above, it will be understood, of course, that the invention is not to be limited thereto. Many modifications may be made, and it is contemplated, therefore, by the appended claims, to cover any such modifications as fall within the true spirit and scope of this invention.

I claim:

1. Apparatus for determining characteristic parameters of electrical devices having nonlinear voltage-current characteristics comprising:
   periodic signal means applying a voltage across such a device;
   variable bias signal means applying a voltage additively to said periodic signal means across said device;
   sensing means for the current through said device generating a signal representative thereof;
   gate means responsive to outputs from said periodic signal means and said sensing means to generate a control signal in response to a predetermined comparative relationship between the outputs of said periodic signal means and said sensing means;
   means driving said variable bias signal means through a predetermined program of signal values; and
   means responsive to said gate means to stop said driving means whenever said predetermined comparative relationship exists.

2. The apparatus of claim 1 wherein said variable bias means has no periodic component.

3. The apparatus of claim 2 wherein said gate means is an AND gate controlled by a periodic component of the output of said sensing means in predetermined phasic relationship with the output of said periodic signal means whereby said gate means responds to a zero incremental slope in said voltage-current characteristic.

4. The apparatus of claim 3 including indicating means providing an output indicative of the magnitude of said characteristics.

5. Apparatus for determining the characteristic parameters of a device having a voltage-current characteristic curve which is other than monotonic comprising:
   variable bias generating means having an input and an output, said output being coupled to said device and being variable in response to a predetermined signal at said input;
   current signal means coupled to said device and generating a signal related to the polarity of current changes through said device;
   voltage signal means coupled to said device and generating a signal related to the polarity of voltage changes across said device; and
   gate means having an output coupled to said variable bias generating means input and first and second inputs coupled to said current signal means and said voltage signal means for applying said predetermined signal to said variable bias generating means input when the polarities of said current and voltage changes are in a first relationship and removing said predetermined signal from said variable bias generating means input when the polarities of said current and voltage changes are in a second predetermined relationship.

6. The apparatus of claim 5 wherein said voltage signal means includes pulse generating means for generating a series of pulses and having an output for coupling to said device.

7. The apparatus of claim 6 wherein said variable bias generating means generates a bias signal which changes in only one direction on application of a predetermined signal thereto but changes in the other direction between applications of said predetermined signal thereto.

8. The apparatus of claim 7 further comprising an amplifier having an output coupled to a first terminal of said device, an input coupled to said variable bias generating means, and an input coupled to said pulse generating means.

9. The apparatus of claim 8 wherein said current signal applying means comprises an amplifier having an input coupled to a second terminal of said device and an output coupled to said first terminal of said gate means.

10. The apparatus of claim 9 wherein said device is a tunnel diode.

11. Apparatus for determining the characteristic parameters of a device having a voltage-current characteristic curve which is other than monotonic comprising:
 variable bias generating means having an input and an output, said output being coupled to said device and being variable in response to a predetermined signal at said input;
 pulse generating means having an output coupled to said device;
 signal sensing means coupled to said device for sensing the response of said device to the output of said pulse generating means;
 gate means having first and second inputs coupled to said pulse generating means and said signal sensing means for generating said predetermined signal at an output when the response of said device to the output of said pulse generating means is of a first polarity and removing said predetermined signal from said output when the response of said device to the output of said pulse generating means is not of said first polarity; and
 coupling means for coupling said gate means output to said variable bias generating means input.

12. The apparatus of claim 11 wherein said variable bias generating means provides a variable bias voltage across said device, said pulse generating means produces voltage pulses across said device, and said signal sensing means senses the current flow through said device resulting from said voltage pulses.

13. The apparatus of claim 12 wherein said gate means produces an output signal pulse when signals in a first polarity relationship are applied to said first and second inputs and no output signal pulse when signals in a polarity relationship other than said first polarity relationship are applied to said inputs.

14. The apparatus of claim 11 wherein said device is a tunnel diode.

* * * * *